(12) United States Patent
Basu et al.

(10) Patent No.: US 12,450,246 B2
(45) Date of Patent: Oct. 21, 2025

(54) SYSTEM AND METHOD FOR GENERATING AN IMPROVED USER INTERFACE FOR DATA ANALYTICS

(71) Applicant: Cognizant Technology Solutions India Pvt. Ltd., Chennai (IN)

(72) Inventors: Vijoy Basu, Bangalore (IN); Ramprasad Ramaraju, Chennai (IN); Joy Viveka Pruthiviraja, Thiruvallur (IN); Vaibogam Shanmugam, Salem (IN); Ravichandran Raju, Erode District (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 208 days.

(21) Appl. No.: 18/083,632

(22) Filed: Dec. 19, 2022

(65) Prior Publication Data

US 2024/0004891 A1 Jan. 4, 2024

(30) Foreign Application Priority Data

Jun. 30, 2022 (IN) .............................. 202241037783

(51) Int. Cl.
| | |
|---|---|
| *G06F 16/248* | (2019.01) |
| *G06F 3/0481* | (2022.01) |
| *G06F 9/451* | (2018.01) |
| *G06F 3/0487* | (2013.01) |

(52) U.S. Cl.
CPC .......... *G06F 16/248* (2019.01); *G06F 3/0481* (2013.01); *G06F 9/451* (2018.02); *G06F 3/0487* (2013.01)

(58) Field of Classification Search
CPC ...... G06F 16/248; G06F 9/451; G06F 3/0481; G06F 3/0487
See application file for complete search history.

(56) References Cited

U.S. PATENT DOCUMENTS

| | | | |
|---|---|---|---|
| 9,619,814 | B2 | 4/2017 | Cardno |
| 9,866,561 | B2 | 1/2018 | Psenka |
| 9,880,719 | B2 | 1/2018 | Dewan |
| 9,984,116 | B2 | 5/2018 | Rais Ghasem |
| 10,453,007 | B2 | 10/2019 | Chu |
| 11,074,533 | B1 | 7/2021 | Upadhyay |
| 11,397,826 | B2 * | 7/2022 | Avanes ................. G06F 21/604 |

(Continued)

FOREIGN PATENT DOCUMENTS

| | | | | |
|---|---|---|---|---|
| WO | WO-2023039212 A1 * | 3/2023 | ........... | G06F 16/221 |

*Primary Examiner* — Haoshian Shih
(74) *Attorney, Agent, or Firm* — CANTOR COLBURN LLP

(57) ABSTRACT

A system and method for generating an improved user interface for data analytics is provided. A first type of data analytics action is performed based on a user request. Data insights are fetched based on the first type of data analytics action for rendering one or more data assets as one or more result sets. Further, a sharing functionality is provided for sharing the one or more data assets for multiple access. Lastly, data assets are rendered in the form of one or more visualization types associated with different Business Intelligence (BI) tools based on a pre-defined set of rules. The rendered multiple data assets are combined based on a second type of data analytics action for configuring and rendering dashboard.

25 Claims, 11 Drawing Sheets

(56) References Cited

U.S. PATENT DOCUMENTS

| | | | | |
|---|---|---|---|---|
| 2010/0005008 | A1* | 1/2010 | Duncker | G06F 3/0484 |
| | | | | 705/26.1 |
| 2010/0042503 | A1* | 2/2010 | Farmer | G06Q 30/02 |
| | | | | 705/14.72 |
| 2012/0203705 | A1* | 8/2012 | Van Beneden | G06Q 10/10 |
| | | | | 705/317 |
| 2015/0170382 | A1* | 6/2015 | Bhatia | G06Q 40/00 |
| | | | | 345/440 |
| 2018/0173715 | A1* | 6/2018 | Dunne | G06F 8/38 |
| 2021/0342344 | A1 | 11/2021 | Kowolenko et al. | |
| 2022/0050884 | A1 | 2/2022 | Sahu et al. | |
| 2022/0147205 | A1* | 5/2022 | Koste | G06F 3/0484 |
| 2022/0337596 | A1* | 10/2022 | Smith | H04L 63/20 |
| 2022/0382779 | A1* | 12/2022 | Ogievetsky | G06F 16/287 |
| 2023/0376508 | A1* | 11/2023 | Bhattacharyya | G06F 16/287 |
| 2023/0401181 | A1* | 12/2023 | Gnanaprakasam | G06F 16/283 |
| 2024/0195841 | A1* | 6/2024 | Crabtree | G06F 16/951 |

* cited by examiner

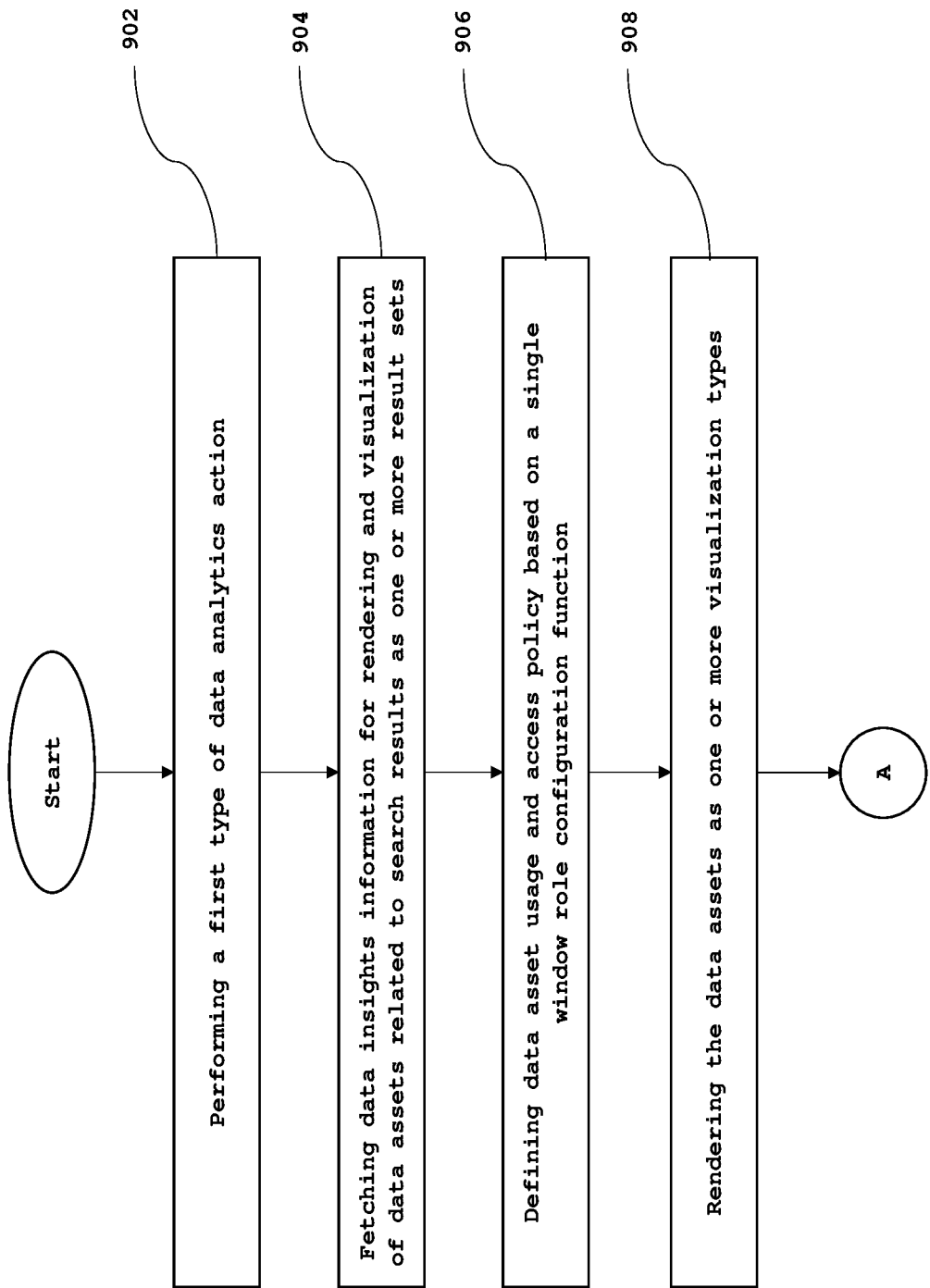

SYSTEM AND METHOD FOR GENERATING AN IMPROVED USER INTERFACE FOR DATA ANALYTICS

FIELD OF THE INVENTION

The present invention relates generally to the field of data analytics, and more particularly, to a system and a method for generating an improved User Interface (UI) for providing optimized data insights based on a single point access for various data analytics solutions.

BACKGROUND OF THE INVENTION

Various organizations pertaining to different domains e.g., healthcare, banking, marketing, sales, operations, Information Technology (IT), real estate, manufacturing, law firms, inventory management, etc. carries out analysis of data associated with their employees, customers, clients, operations, etc. for generating data insights. Organizations use various data analytics and Business Intelligence (BI) tools and frameworks for determination and generation of data insights. Services offered by such tools and frameworks usually target only specific data analytics assets (or solutions) (e.g., data sets, data insights, analytical reports and dashboards, Artificial Intelligence and Machine Learning (AI and ML) data model, etc.) or target specific data users (e.g., data consumers, data analyst, data scientists, leaders/owners of data, Information Technology (IT) administration, etc.).

It has been observed that there is a considerable overhead for organizations and data users for generating insights from data and users have a disjointed data analytics experience. Typically, data analytics insights are scattered across various analytics platforms making data analytics time consuming for users in order to generate insights from the available data. The data is generated and stored using several computing applications by different departments of the organization for different users. Further, data analytics is carried out and the analyzed data is stored using multiple Business Intelligence (BI) tools based on need and requirements of the users, cost involved for data maintenance and data maintainability. Furthermore, data analytics solutions are available across multiple heterogeneous platforms giving a fragmented user experience. It has been observed that in order to consume data and data insights, organizations utilize multiple analytical solutions which are built using various technologies and these analytical solutions have multiple access workflows as various stakeholders are involved. As such, users have to access data, reports, dashboards and data models in different tools and systems, thereby making the data analytics process cumbersome.

Typically, existing BI tools and portals are unable to accumulate all data analytics information in one interface and do not provide ability to personalize data analytical assets for different data users. It has been observed that multiple floating links and bookmarks are used for accessing the assets and analytical reports, thereby making it difficult for the users to quickly generate and access data insights. Further, it is quite complex to configure a dashboard by combining data analytics reports generated using different BI technologies. Also, combining data analytical reports associated with different BI technologies is time consuming and a high cost is involved to develop individual mixed data insights for each dashboard. Further, configuration, publishing, and maintenance of dashboards for data insights is highly dependent on an organization's IT team. Yet further, development of such data insights may go through a typical Software Development Life Cycle (SDLC), which may take weeks or months for development. Further, complexity of personalization increases to include other analytical assets (e.g., data, Artificial Intelligence/Machine Intelligence (AI/ML) models or any new analytical assets) and deliver them in a single interface for different data users or user groups.

Furthermore, various departments in organizations are not able to collaborate due to lack of unified catalog of data analytical assets across the organization. Thus, lack of ability to determine available data analytical assets usually lead to duplication of data and analytical assets. Also, there is a lack of trust on the quality of analytical assets, as there is no specific accountability. Furthermore, there is a lack of compliance and limited enforcement of policies for privacy and security on the usage of analytical assets. Yet further, governance policy implemented at asset's end is not continued when the asset is used in a different interface, as the technology is disconnected. In case of data sets, users download or access data from a governed data store and when the user uses this in a BI tool to build report, the access to this is defined at the report's end overwriting the governance of the data owner. Yet further, existing BI tools and portal do not offer the ability to authorize analytics asset usage, monitor usage and access in a controlled single environment.

In light of the aforementioned drawbacks, there is a need for a system and a method which provides for generating an improved User Interface (UI) for data analytics and providing optimized data insights. There is a need for a system and a method which provides for a single point access for various data analytics functions. Further, there is a need for a system and a method which provides for processing of datasets for generating data insights in a personalized manner. Furthermore, there is a need for a system and a method which provides for avoiding duplication of data and analytical assets. Yet further, there is a need for a system and a method which provides for determining data insights generation accountability, maintaining privacy and security and monitoring usage and access in a controlled single environment.

SUMMARY OF THE INVENTION

In various embodiments of the present invention, a system for generating an improved user interface for data analytics is provided. The system comprises a memory storing program instructions, a processor executing program instructions stored in the memory and a user interface generation engine executed by the processor. The user interface generation engine is configured to perform a first type of data analytics action based on a user request. The user interface generation engine is configured to fetch data insights based on the first type of data analytics action for rendering one or more data assets as one or more result sets. Further, the user interface generation engine is configured to provide a sharing functionality for sharing the one or more data assets for multiple access. Lastly, the user interface generation engine is configured to render data assets in the form of one or more visualization types associated with different Business Intelligence (BI) tools based on a pre-defined set of rules. The rendered multiple data assets are combined based on a second type of data analytics action for configuring and rendering dashboard.

In various embodiments of the present invention, a method for generating an improved user interface for data analytics is provided. The method is implemented by a processor executing instructions stored in a memory. The method comprises performing a first type of data analytics action based on a user request. The method comprises fetching data insights based on the first type of data analytics action for rendering one or more data assets as one or more result sets. Further, the method comprises providing a sharing functionality for sharing the one or more data assets for multiple access. Lastly, the method comprises providing a sharing functionality for sharing the one or more data assets for multiple access. The rendered multiple data assets are combined based on a second type of data analytics action for configuring and rendering dashboard.

In various embodiments of the present invention, computer program product is provided. The computer program product comprising a non-transitory computer-readable medium having computer program code stored thereon, the computer-readable program code comprising instructions that, when executed by a processor, causes the processor to perform a first type of data analytics action based on a user request. Data insights are fetched based on the first type of data analytics action for rendering of one or more data assets as one or more result sets. Further, a sharing functionality is provided for sharing the one or more data assets for multiple access. Lastly, data assets are rendered in the form of one or more visualization types associated with different Business Intelligence (BI) tools based on a pre-defined set of rules. The rendered multiple data assets are combined based on a second type of data analytics action for configuring and rendering dashboard.

BRIEF DESCRIPTION OF THE ACCOMPANYING DRAWINGS

The present invention is described by way of embodiments illustrated in the accompanying drawings wherein:

FIGS. 9 and 9A illustrates a flowchart depicting a method for generating an improved user interface for data analytics and optimized data insights.

DETAILED DESCRIPTION OF THE INVENTION

The present invention discloses a system and a method which provides for generating an improved User Interface (UI) for data analytics and providing optimized data insights based on a single point access for various data analytics functions. The present invention provides for a unified UI for optimally generating data insights. The present invention provides for personalized user experience providing continuous integration of data analytical assets (or solutions) from multiple Business Intelligence (BI) technologies by quickly and automatically configuring and publishing a single dashboard for various departments in the organization. The present invention provides for dynamic access configuration and enables personalized role-based access to the dashboards by various data users in the organization. The present invention provides for monitoring user behaviors by tracking every click on the UI, thereby enabling identification of usage analytics. Further, the present invention provides for avoiding duplication of data and analytical assets across organization. Furthermore, the present invention provides for determining data insights generation accountability, maintaining privacy and security of generated data insights and monitor usage and access of the data in a controlled single environment. Furthermore, the present invention provides for taking quick actions for faster determination of data and data insights by providing unified and connected digital experience. Yet further, the present invention provides for modernized user experience (UX) and personalized data analytics experience.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications, and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
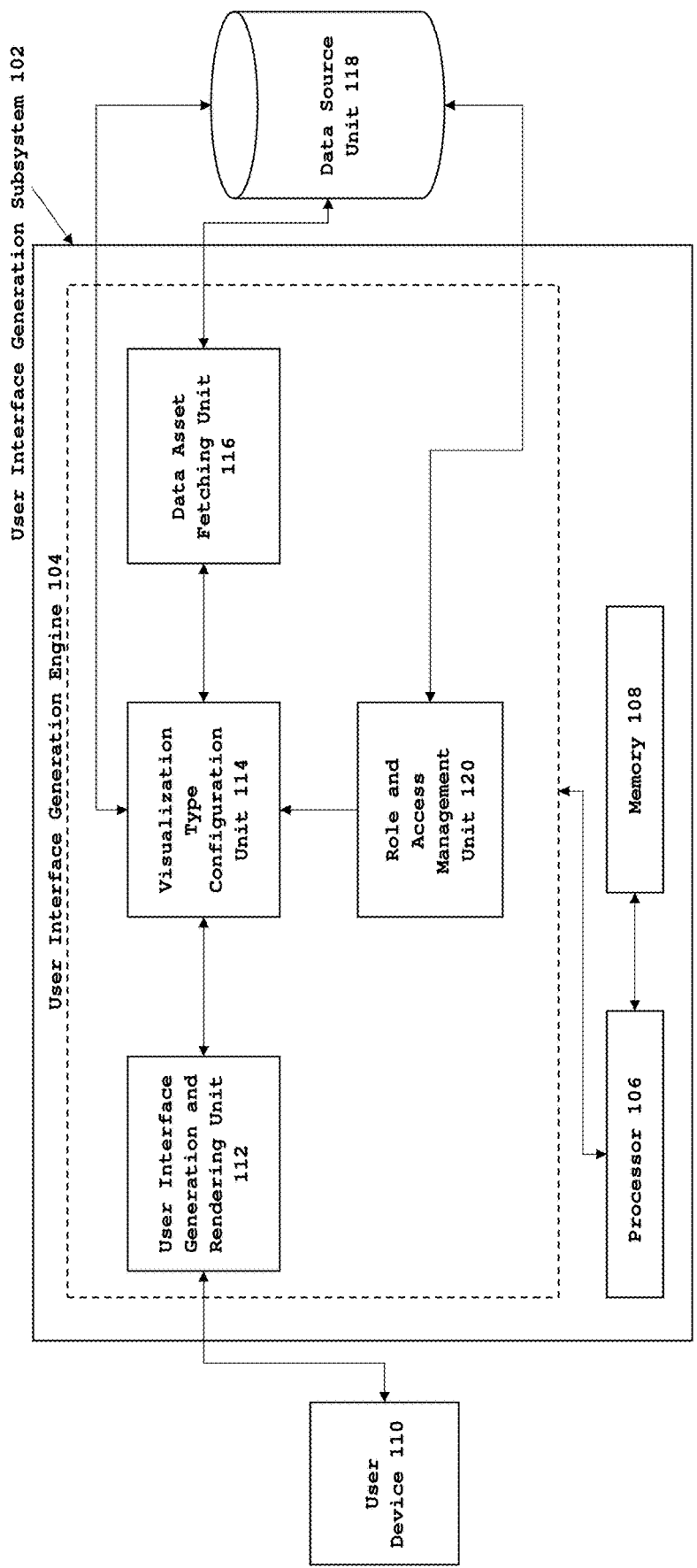
FIG. 1 is a block diagram of a system for generating an improved User Interface (UI) for data analytics and providing optimized data insights, in accordance with an embodiment of the present invention.

FIG. 1 is a block diagram of a system 100 for generating an improved User Interface (UI) for data analytics and providing optimized data insights, in accordance with various embodiments of the present invention. Referring to FIG. 1, in an embodiment of the present invention, the system 100 comprises a User Interface (UI) generation subsystem 102, a user device 110 and a data source unit 118. The user device 110 and the data source unit 118 are connected with the UI generation subsystem 102 via a communication channel (not shown). The communication channel (not shown) may include, but is not limited to, a physical transmission medium, such as, a wire, or a logical connection over a multiplexed medium, such as, a radio channel in telecommunications and computer networking. Examples of radio channel in telecommunications and computer networking may include, but are not limited to, a local area network (LAN), a metropolitan area network (MAN) and a wide area network (WAN).

In an embodiment of the present invention, the user interface generation subsystem 102 (subsystem 102) is configured with a built-in mechanism for automatically generating a UI for providing improved data analytics and optimized data insights. In an exemplary embodiment of the present invention, the subsystem 102 provides a unified digital experience to the users by providing an integrated data analytics platform based on one or more functionalities such as, but not limited to, single user interface (UI) for data analytics and generating data insights, providing a single dashboard for multiple data reports and analytical assets associated with multiple BI tools, data user (e.g. data consumers, data analyst, data scientists, leaders/owners, Information Technology (IT) administration, etc.) based personalized data insights generation, continuous data access across various platforms (e.g., centralized data stores, data marts, BI tools, applications and other analytical solutions), Artificial Intelligence (AI) based dynamic data insights, a single catalog containing multiple analytical assets, and private and secure data analytics.

In another embodiment of the present invention, the subsystem 102 may be implemented in a cloud computing architecture in which data, applications, services, and other resources are stored and delivered through shared datacenters. In an exemplary embodiment of the present invention, the functionalities of the subsystem 102 are delivered to a user as Software as a Service (SaaS) or a Platform as a Service (Paas) over a communication network.

In yet another embodiment of the present invention, the subsystem 102 may be implemented as a client-server architecture. In this embodiment of the present invention, a client terminal accesses a server hosting the subsystem 102 over a communication network. The client terminals may include but are not limited to a computer, a tablet, or any other wired or wireless terminal. The server may be a centralized or a decentralized server.

In an embodiment of the present invention, the subsystem 102 comprises a user interface generation engine 104 (engine 104), a processor 106 and a memory 108. In various embodiments of the present invention, the engine 104 is configured to provide improved data analytics for generating optimized data insights. The various units of the engine 104 are operated via the processor 106 specifically programmed to execute instructions stored in the memory 108 for executing respective functionalities of the units of the engine 104 in accordance with various embodiments of the present invention.

In an embodiment of the present invention, the engine 104 comprises a user interface generation and rendering unit 112, a visualization type configuration unit 114, a data asset fetching unit 116 and a role and access management unit 120. The operation of the various units of the engine 104 has been explained in detail with respect to FIG. 2.

Figure 2:
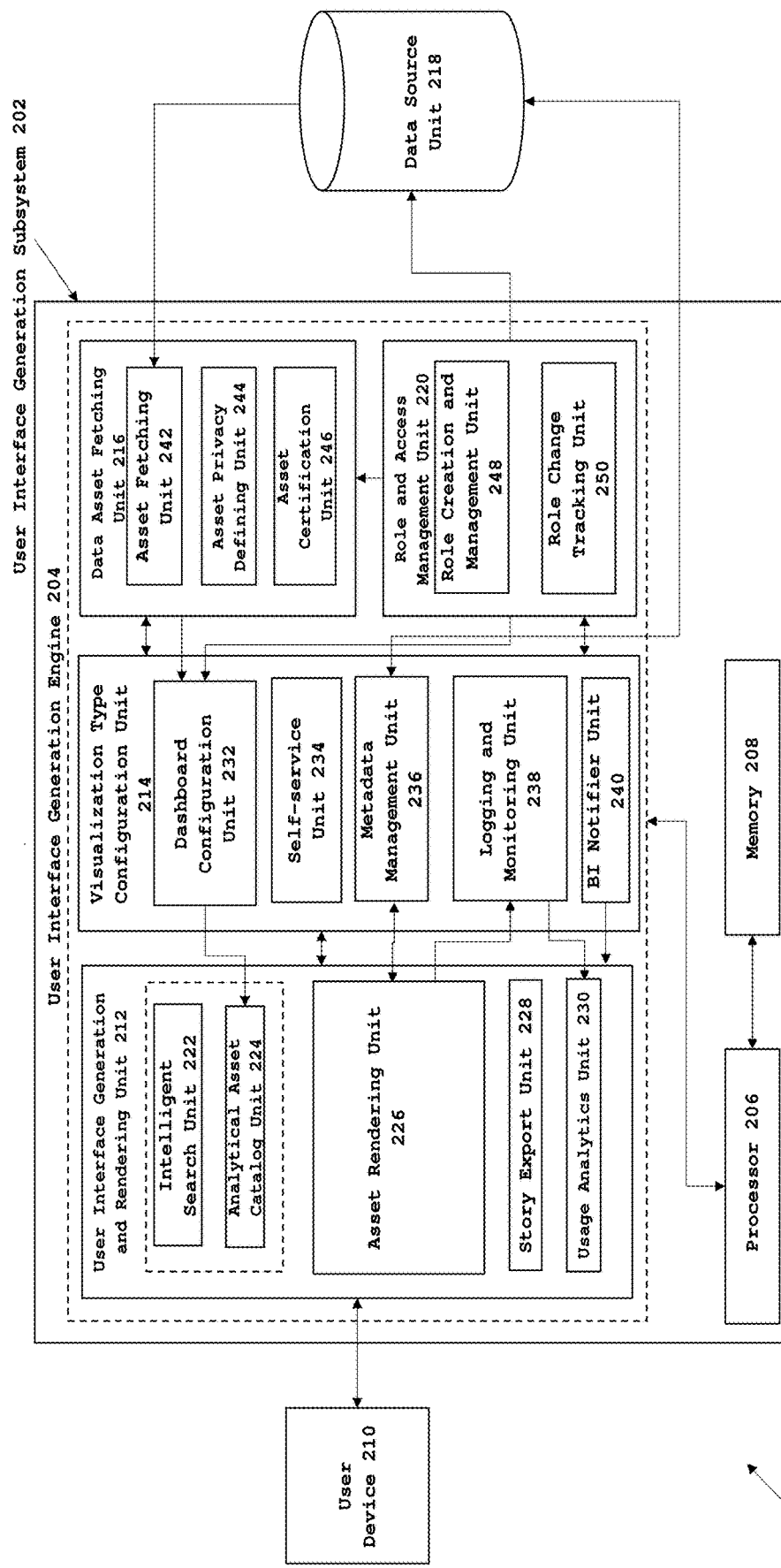
FIG. 2 is a detailed block diagram of a system for generating an improved User Interface (UI) for data analytics and providing optimized data insights, in accordance with an embodiment of the present invention.

FIG. 2 is a detailed block diagram of the system 200 (100, FIG. 1) in an embodiment of the present invention. The system 200 comprises a UI generation subsystem 202 (102, FIG. 1), a user device 210 (110, FIG. 1) and a data source unit 218 (118, FIG. 1). The subsystem 202 comprises a user interface generation engine 204 (104, FIG. 1) for data analytics and providing optimized data insights. The various units of the engine 204 are operated via the processor 206 (106, FIG. 1) specifically programmed to execute instructions stored in the memory 208 (108, FIG. 1) for executing respective functionalities of the units of the engine 204, in accordance with various embodiments of the present invention.

In an embodiment of the present invention, the user interface generation and rendering unit 212 (112, FIG. 1) comprises an intelligent search unit 222, an analytical asset catalog unit 224, an asset rendering unit 226, a story export unit 228 and a usage analytics unit 230. In an embodiment of the present invention, the visualization type configuration unit 214 (114, FIG. 1) comprises a dashboard configuration unit 232, a self-service unit 234, a metadata management unit 236, a logging and monitoring unit 238 and a Business Intelligence (BI) notifier unit 240. In an embodiment of the present invention, the data asset fetching unit 216 (116, FIG. 1) comprises an asset fetching unit 242, an asset privacy defining unit 244 and an asset certification unit 246. In an embodiment of the present invention, the role and access management unit 220 (120, FIG. 1) comprises a role creation and management unit 248 and a role change tracking unit 250.

In operation, in an embodiment of the present invention, one or more users sends a request to the engine 204 for initiating a first type of data analytics action via the user device 210 by inserting values for search in a search bar of a Graphical User Interface (GUI) rendered via the user device 210. The user may include, but is not limited to, data consumers, data analysts, data scientists, leaders/owners of data and Information Technology (IT) administration. The first type of data analytics action may include, but is not limited to, a search request for one or more analytical assets (or solutions) carried out in an organization such as, data searching, data insights generation, data reports generation, dashboard insights generation, data model determination, etc. For example, the user may search for data related to attrition in an organization for analysis and generating insights. The user device 210, may include, but is not limited to, a computer, a laptop, a smartphone, and a tablet. The request is received by the user interface generation and rendering unit 212 of the subsystem 202.

In an embodiment of the present invention, the user interface generation and rendering unit 212, upon receiving the search request, is configured to firstly, authenticate the user by carrying out a Single-Sign-On (SSO) authentication. The authentication is carried out by connecting to the user interface generation and rendering unit 212 in communication with the visualization type configuration unit 214 via Application Programming Interfaces (APIs), which accesses an Azure® active directory (not shown) present therein. The Azure® active directory (not shown) comprises user data (user roles, access definition, data security, login details, etc.) of multiple users, which are used for authenticating the users. The SSO aids in accessing all the analytical assets and data insights reports irrespective of the underlying BI tool technology. In an exemplary embodiment of the present invention, the search request is an AI based search, which is received and processed by the intelligent search unit 222 of the user interface generation and rendering unit 212. The search is carried out for at least, but not limited to, data and asset determination, data insights generation and data insights recommendations.

Figure 3:
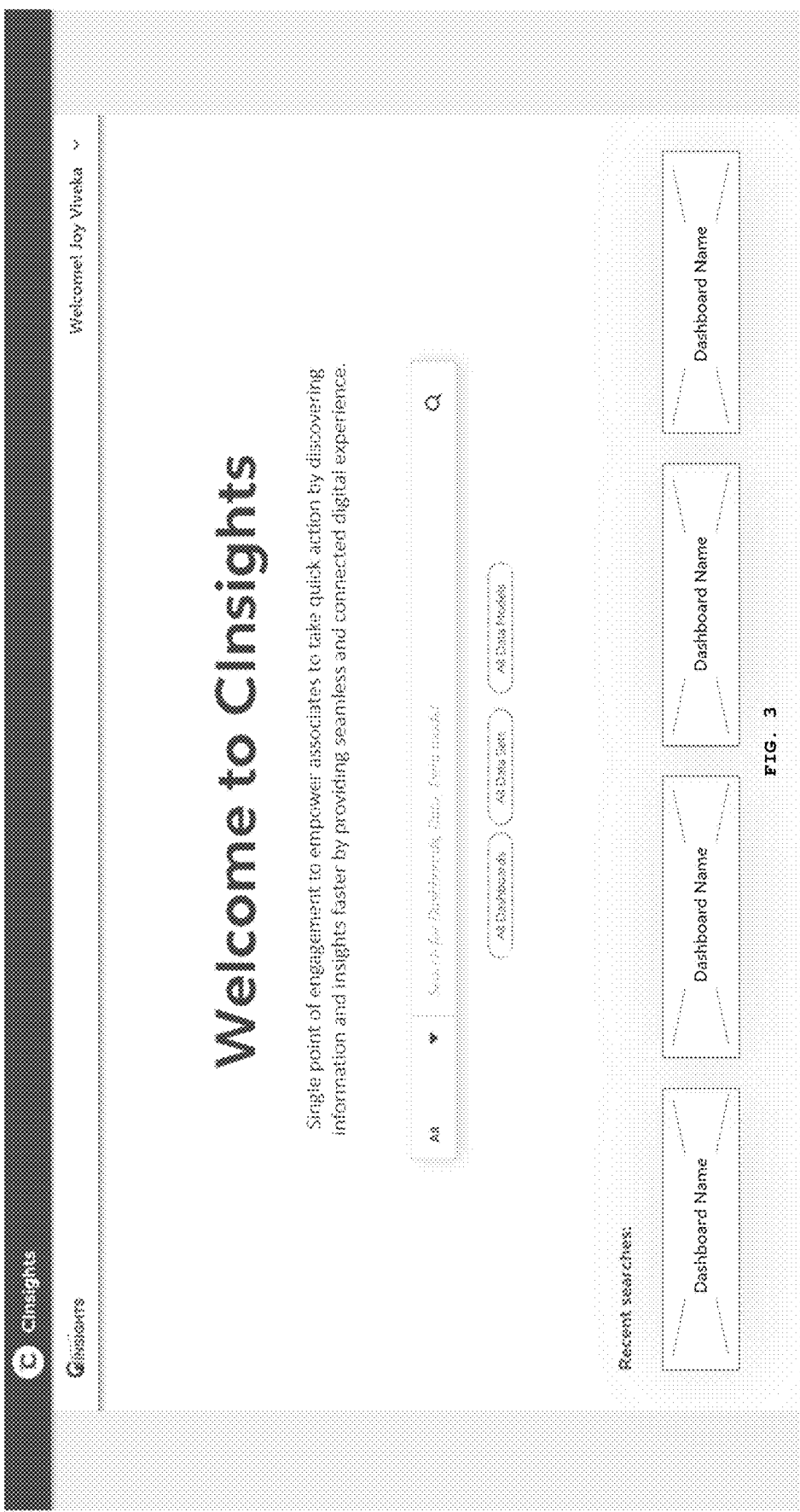
FIG. 3 illustrates a screenshot of a Graphical User Interface (GUI) depicting rendering and visualization of search results as one or more result sets.
Figure 4:
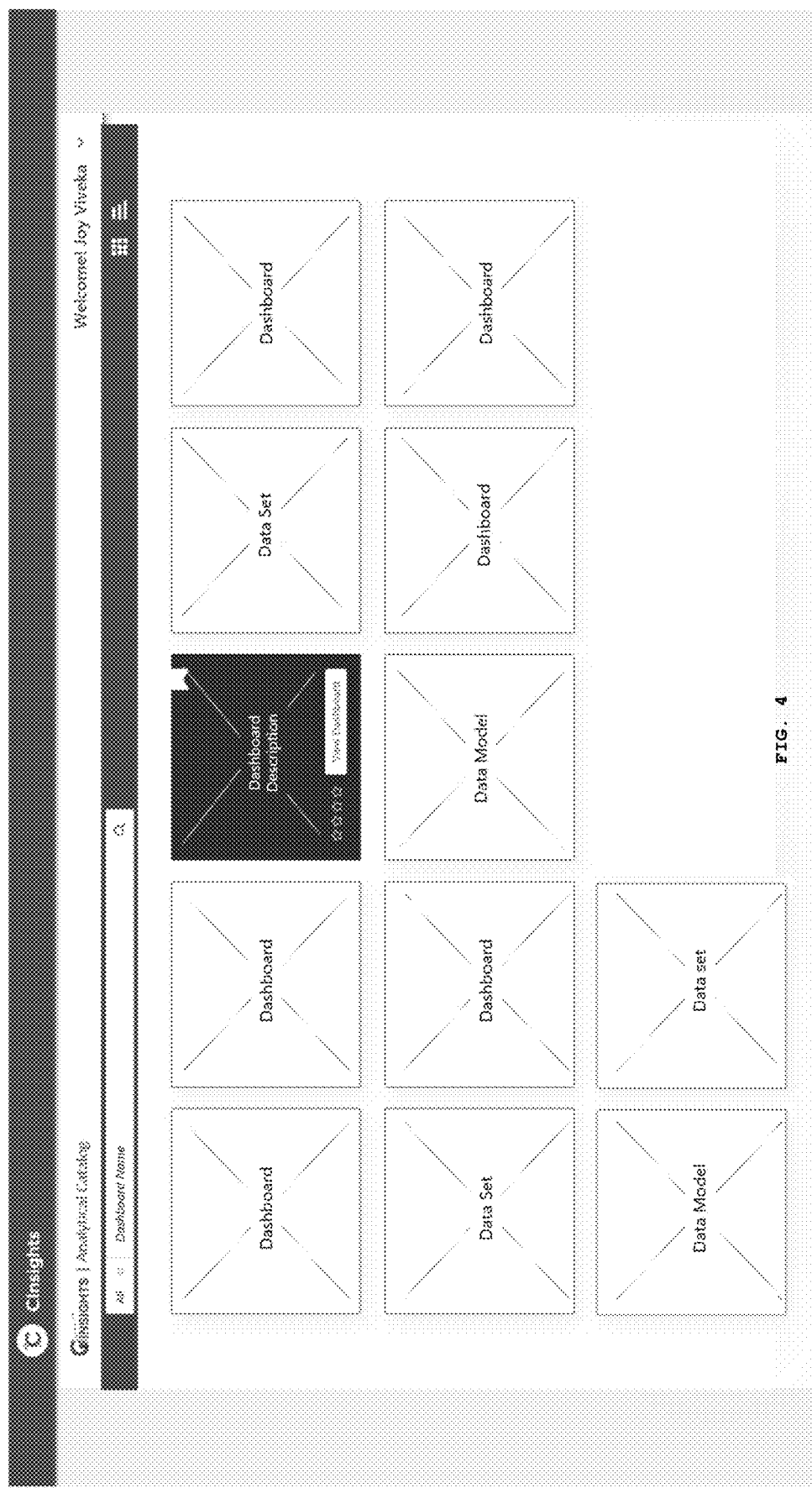
FIG. 4 illustrates a screenshot of the GUI depicting a unified catalog of multiple analytical assets.
Figure 5:
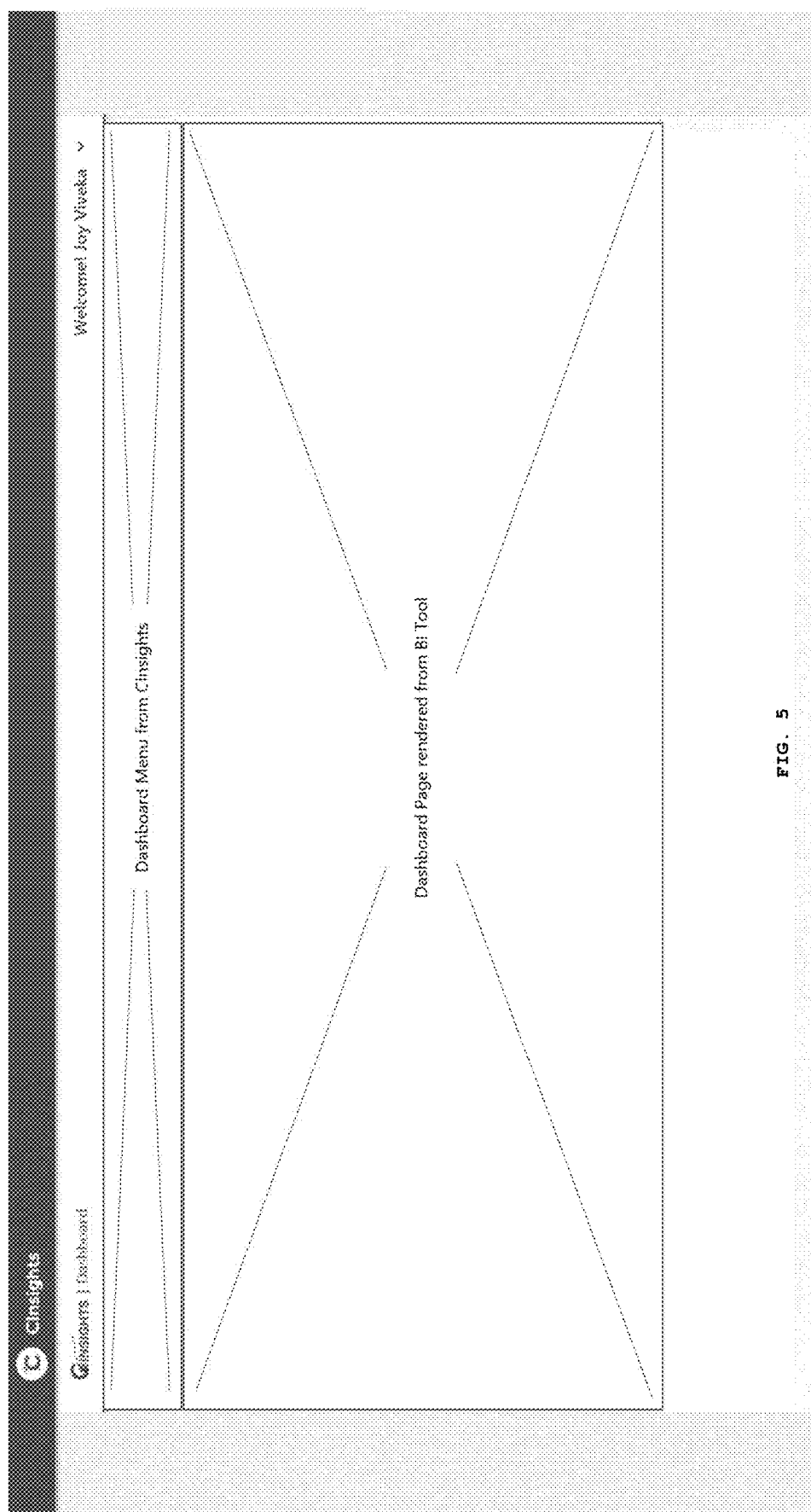
FIG. 5 and FIG. 6 illustrates a screenshot of the GUI depicting rendering of data insights.
Figure 6:
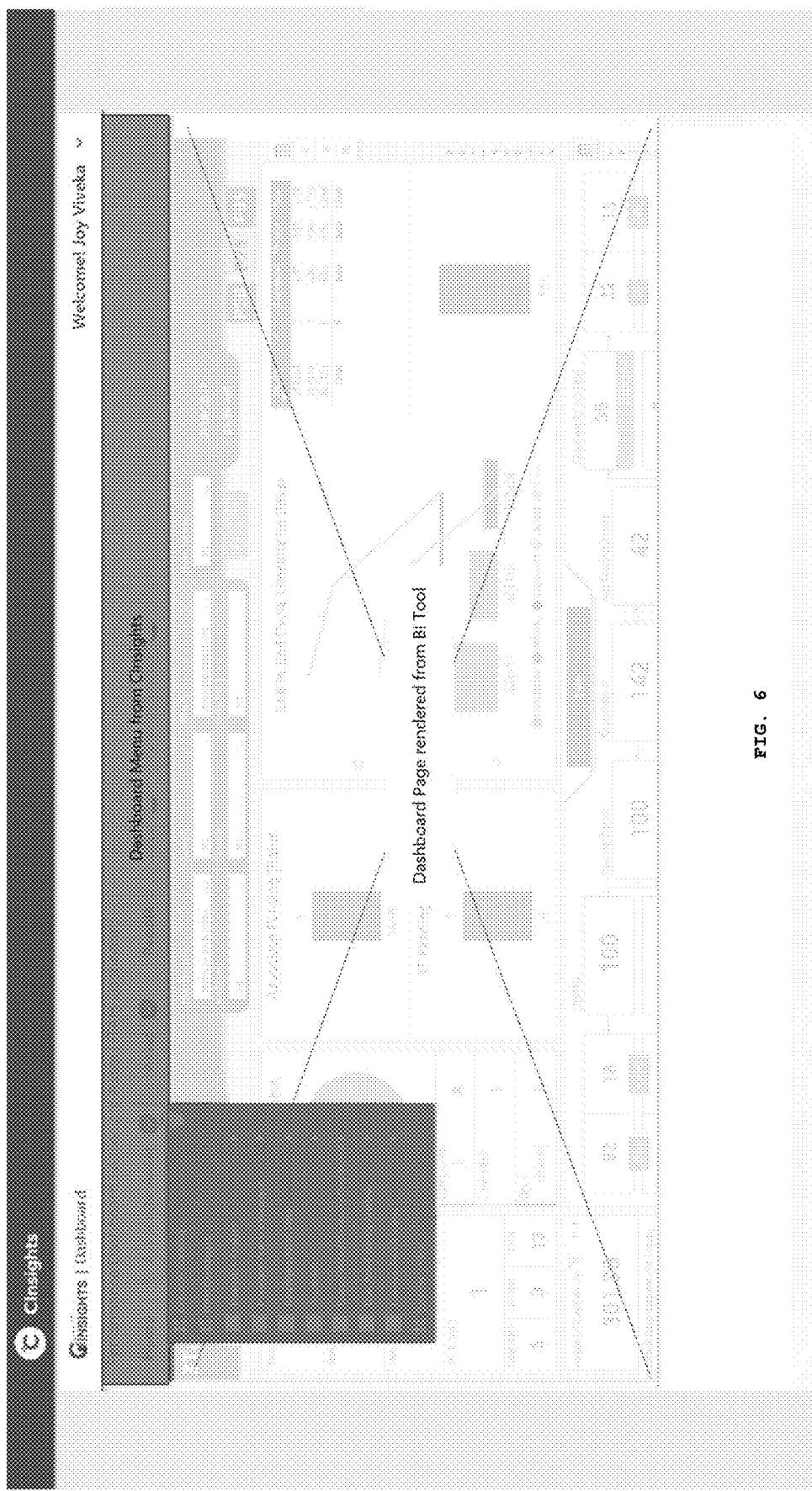

In an embodiment of the present invention, the analytical asset catalog unit 224 of the user interface generation and rendering unit 212 is configured to fetch data insights from the dashboard configuration unit 232 of the visualization type configuration unit 214 based on the first type of data analytics action for rendering and visualization of one or more search results associated with the data insights as one or more result sets via the dynamic Graphical User Interface (GUI) rendered on the user device 210, as illustrated in FIG. 3. The GUI renders a unified catalog of multiple analytical assets for visualization and consumption by the users via a single self-service data interface provided by the data asset rendering unit 226, as illustrated in FIG. 4. The single self-service data interface is associated with multiple BI tool technologies associated with the received user request. In an exemplary embodiment of the present invention, the analytical assets include, but are not limited to, data sets, data reports, data insights, dashboards, and data models. The BI tool technologies may include, but are not limited to, big data sources and on-premises and SaaS applications (such as, Power BI®, Qlik Sense®, Tableau®, Oracle® cloud analytics, etc.). The self-service unit 234 of the visualization type configuration unit 214 is associated with multiple BI tool technologies which are accessed by the analytical asset catalog unit 224 of the user interface generation and rendering unit 212 via one or more embedded analytics services for rendering the data insights in the event of launching the analytical assets from the search result via the GUI, as illustrated in FIG. 5 and FIG. 6.

In an embodiment of the present invention, the asset rendering unit 226 of the user interface generation and rendering unit 212 is configured to communicate with the asset fetching unit 242 of the data asset fetching unit 216 and the metadata management unit 236 of the visualization type configuration unit 214 for fetching data assets from the data source unit 218 in order to render the one or more data assets related to search results as the one or more result sets via the GUI for the received search request. In an exemplary embodiment of the present invention, the result sets are rendered via the GUI based on one or more rendering techniques such as, but are not limited to, ranking of result sets, accessing criteria of the result sets and frequency of usage of result sets. In an embodiment of the present invention, the data source unit 218 may be located at a remote location (e.g., in a cloud environment) or on-premises. In an exemplary embodiment of the present invention, the data source unit 218 at the remote location may be a SaaS based system or a private cloud-based system. In another exemplary embodiment of the present invention, the data source unit 218 located on-premises may be a business system or a custom system. In an embodiment of the present invention, the data source unit 218 may include, but is not limited to, centralized data stores, data marts, BI tools, applications, and other analytical solutions comprising different types of data assets associated with the organization (e.g., operations data, customer data, functional data, user data, etc.).

In an embodiment of the present invention, the data assets are fetched by the asset fetching unit 242 of the data asset fetching unit 216 from the data source unit 218 via embedded APIs (e.g., analytics Java Script (JS) APIs). Advantageously, the asset metadata is not saved in the subsystem 202 as embedded APIs are used, thereby maintaining data privacy. In an embodiment of the present invention, the role creation and management unit 248 of the role and access management unit 220 is configured to provide a single window role configuration function to enable user-based usage access by the data asset fetching unit 216 and define data asset usage and access privacy. The single window role configuration is used in the data source for providing Row Level Security (RLS) in order to carry out data analytics and generating data insights for the user roles across various technologies. In an exemplary embodiment of the present invention, the role owner may at least create roles, tag users, and assign roles to various users. The asset owners may use these roles for providing asset access to the users. In an embodiment of the present invention, the asset privacy defining unit 244 of the data asset fetching unit 216 is configured with feature sets that enable users to configure page level access to the asset in association with the role creation and management unit 248 for providing personalized rendering of assets via the asset rending unit 226 of the user interface generation and rendering unit 212. Further, the asset fetching unit 242 is configured to provide a sharing functionality for sharing the one or more data assets across the organization for access by multiple users. Sharing of one or more data assets relates to sharing of data assets by a first user to a second user based on a sharing request sent by the second user to the first user. The second user may visualize the data asset at his/her end, instead of configuring a new data asset. For example, if a first user has a data asset or visualization type generated for a demand and supply operation and the second user requires to view the same, then the second user may send a request to the first user for viewing and using the already generated visualization type for demand and supply or to use this visualization type inside his/her dashboards with combined assets. The first user may provide access to the second user for viewing the same at the second user's end. Therefore, advantageously, sharing of one or more visualization types aid in reducing duplication of the same visualization types in an organization.

In another embodiment of the present invention, the role creation and management unit 248 of the role and access management unit 220 is configured to provide users a functionality to switch between multiple roles and access the visualizations of data insight and data summary on the GUI. In an embodiment of the present invention, the role change tracking unit 250 of the role and access management unit 220 is configured to track any changes made to the user roles. The role change tracking unit 250 further tracks history associated with the role change.

In an embodiment of the present invention, the visualization type configuration unit 214 in communication with the role and access management unit 220 communicates with the Azure® active directory (not shown) for providing user-based security for the fetched data assets. In an embodiment of the present invention, the fetched data assets are transmitted to the user interface generation and rendering unit 212 for rendering via the GUI, which further functions as a custom data interface. The fetched data assets are rendered in the form of one or more visualization types associated with different BI tools via the GUI for the search request based on a pre-defined set of rules. The visualization types may include, but are not limited to, one or more dashboards for data assets, reports and insights on the data assets, data sets of the data asset, and model created for the data assets. In an embodiment of the present invention, the visualization types are capable of being downloaded based on a download request sent by the users from the user device 210 via the UI to the story export unit 228 of the user interface generation and rendering unit 212. In an exemplary embodiment of the present invention, the visualization types may be downloaded in a pre-defined format such as, but is not limited to, Portable Document Format (PDF) and a Power Point Presentation (PPT) along with, applied filters, visual filters, and slicers. The downloaded visualization types may include, but are not limited to, downloaded data asset dashboards, downloaded data asset report, downloaded data asset models. In an embodiment of the present invention, the BI notifier unit 240 of the visualization type configuration unit 214 in communication with the user interface generation and rendering unit 212 is configured to send alerts and email notifications to the user device 210 for sharing the generated visualization types. In an embodiment of the present invention, the user interface generation and rendering unit 212 is configured to provide a one-click functionality to choose and enable viewing of different visualization types via the user devices 210.

In the embodiment of the present invention, the rendered data assets, in the form of visualization types, are capable of being configured based on a second type of data analytics action, via the UI, for combining multiple data assets by the dashboard configuration unit 232 of the visualization type configuration unit 214. The dashboard configuration unit 232 provides a dashboard configuration feature, which includes a first feature set to rapidly configure dashboard and generate visualization types with mixed analytical assets from the one or more BI tool technologies. In an exemplary embodiment of the present invention, the first feature set provides functionality of combining the data assets together for rapidly configuring and rendering visualization types, irrespective of the BI tool technology. In another embodiment of the present invention, the dashboard configuration feature further includes a second feature set. In an exemplary embodiment of the present invention, the visualization type configuring unit 214, based on the second feature set, is configured to provide user specific access configuration to the rendered dashboards along with interface functionalities such as, but are not limited to, drag, and drop functionality for creating the visualization types on the GUI and hide and show functionality for the rendered visualization types.

Figure 7:
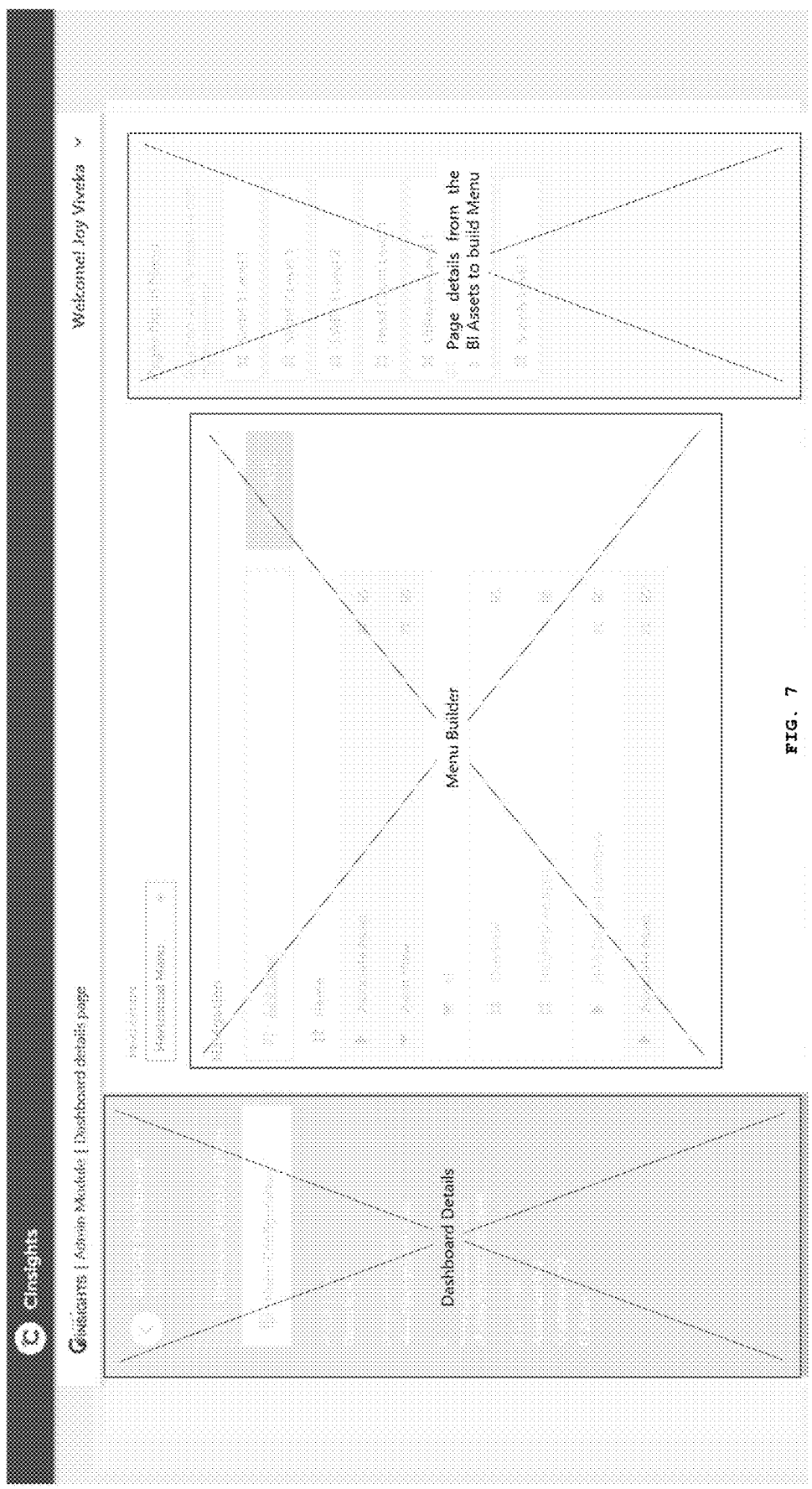
FIG. 7 illustrates a screenshot of the GUI depicting management services provide for downloading of a batch of visualization types and administration services.

In an embodiment of the present invention, the user interface generation and rendering unit 212 is configured to provide one or more service types associated with the visualization types in communication with the self-service unit 234 of the visualization type configuration unit 214. The one or more service types may include, but are not limited to, management services, search services and fulfilment services. In an exemplary embodiment of the present invention, the management services provide for downloading of a batch of visualization types and administration services, as illustrated in FIG. 7.

In another exemplary embodiment of the present invention, search services relate to searching of the visualization types associated with the data assets by the intelligent search unit 222. For example, searching may relate to searching for data, dashboards associated with the data, insights associated with data and models associated with data in association with the data asset fetching unit 216, as elaborated above in the specification. In yet another embodiment of the present invention, the user interface generation and rendering unit 212 is configured to provide fulfilment services relating to rendering and visualization of visualization types based on embedding services of respective BI tool technologies or embedding services. In an embodiment of the present invention, the visualization type configuration unit 214 communicates with the data source unit 218 for fetching the data stored therein via the data asset fetching unit 216 for rendering on the user interface generation and rendering unit 212. In an exemplary embodiment of the present invention, the visualization type configuration unit 214 communicates with the data source unit 218 based on a token-based authentication or a ticket-based authentication.

Figure 8:
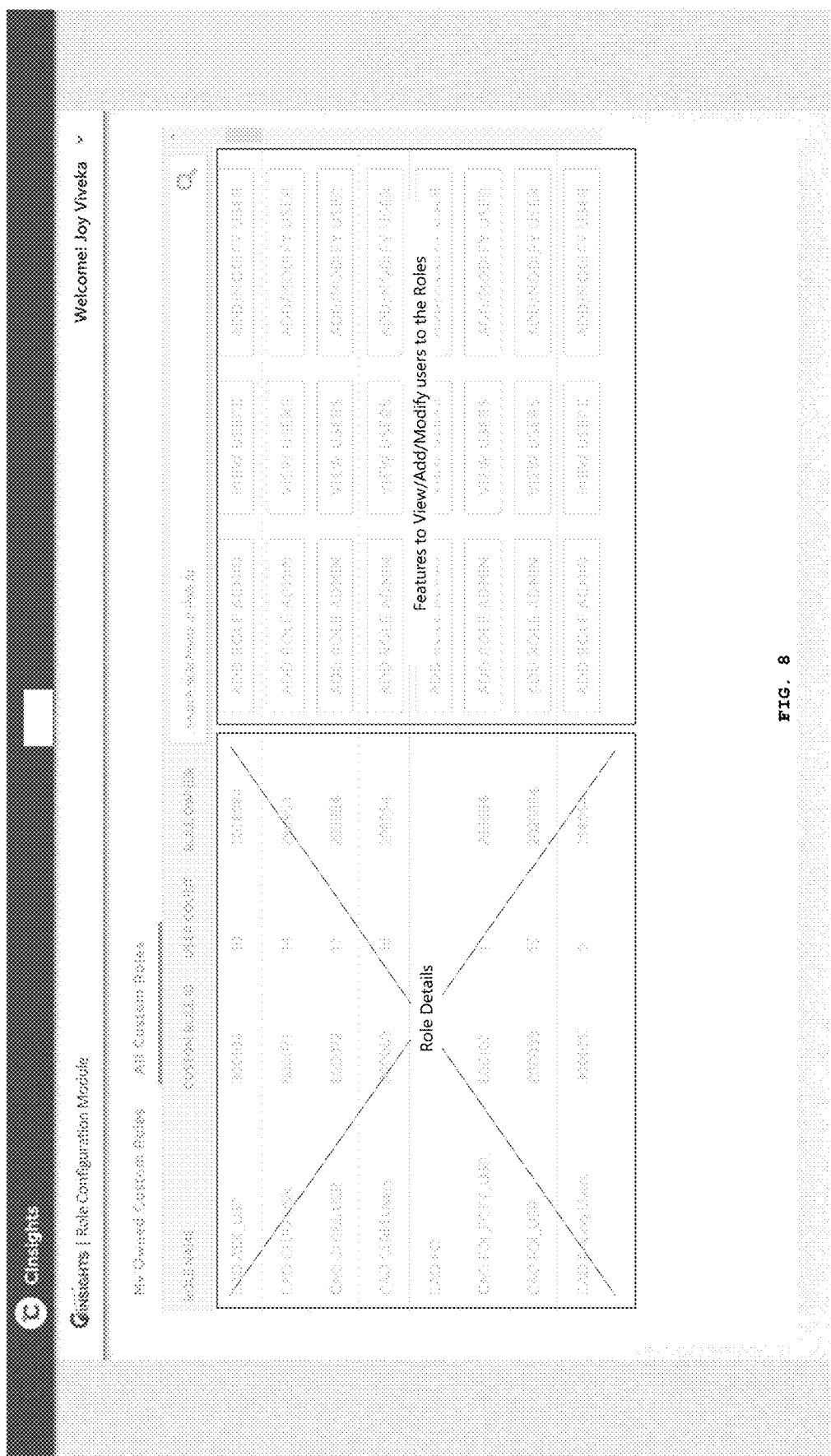
FIG. 8 illustrates a screenshot of the GUI depicting access services.

In an embodiment of the present invention, downloading of a batch of visualization types is carried out via embedding services based on an initiation event comprising a user request received by the user interface generation and rendering unit 212. The user having authorization and authentication for accessing the visualization types may download the visualization types via the story export unit 228. Further, the story export unit 228 communicates with the data source unit 218 for fetching the data assets associated with the visualization types, which are required to be downloaded. In an exemplary embodiment of the present invention, the story export unit 228 communicates with the data source unit 218 using a certificate and/or a token-based authentication provided by the asset certification unit 246 of the data asset fetching unit 216 for fetching the data assets associated with the visualization types, which are required to be downloaded. In an exemplary embodiment of the present invention, the visualization types may be downloaded from cloud. In another embodiment of the present invention, access services are enabled by a user (e.g., data asset owners) having authentication and authorization. The authentication is carried out via API and authorization is based on user role. The access services manage one or more functions such as, but are not limited to, user roles for accessing the visualization types associated with the datasets, roles systems associated with the user roles and meta-data management associated with the roles, as illustrated in FIG. 8.

In an embodiment of the present invention, the usage analytics unit 230 of the user interface generation and rendering unit 212 is configured to provide a rule-based GUI usage access. In an embodiment of the present invention, the logging and monitoring unit 238 of the visualization type configuration unit 214 is configured to track every action of the user carried out via the GUI by using the BI tools associated with the visualization type configuration unit 214. The tracked user action may include, but is not limited to, a click on the UI made by the user, usage of assets and configuration changes carried out via the UI by the user. In another embodiment of the present invention, the logging and monitoring unit 238 is configured to track anomalies related to access and operation of the user interface generation engine 204 by monitoring tokens provided for access of the GUI.

In an embodiment of the preset invention, the self-service unit 234 of the visualization type configuration unit 214 is configured to provide a self-service generation of a custom module to personalize the visualization type layout and widgets including, but is not limited to, insights, key performance indicators (KPIs) and reports from different data assets from across multiple BI technologies. In an embodiment of the present invention, the user interface generation and rendering unit 212 is configured to provide a BI analyzer for generating dashboard by accessing the data sets, reports, and data model assets.

Figure 9A:
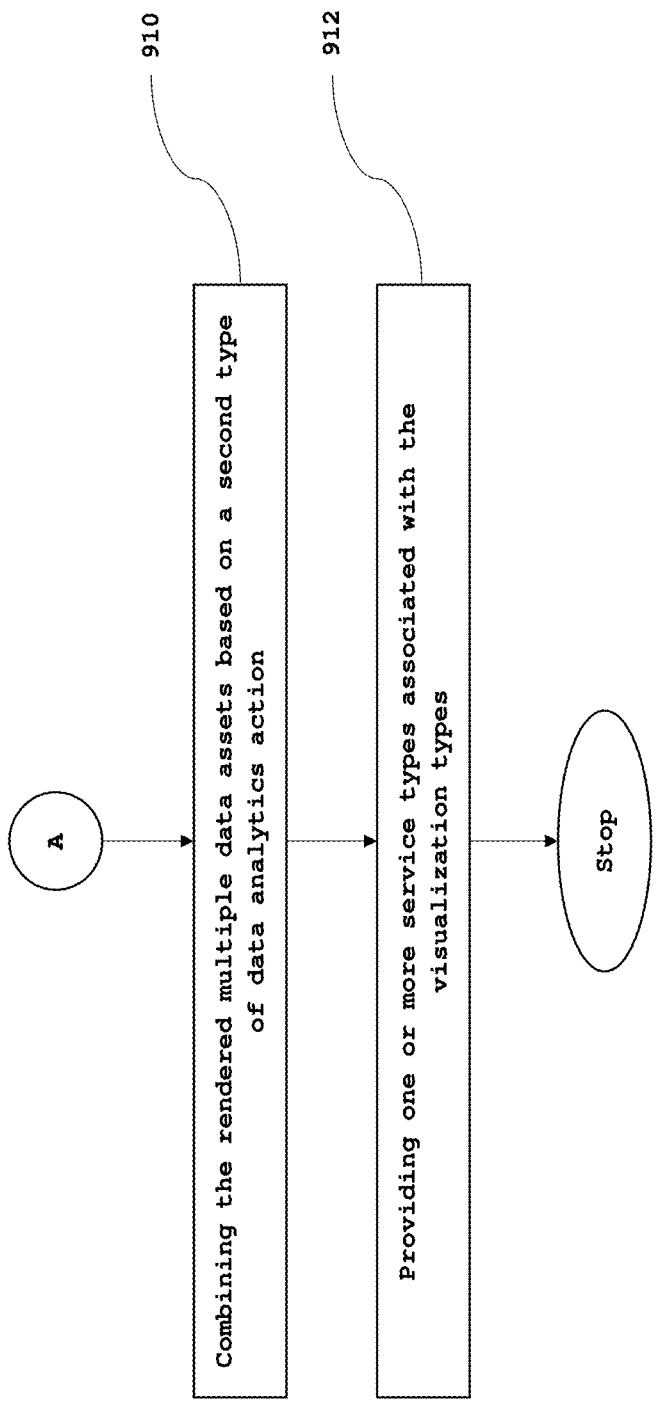

FIGS. 9 and 9A illustrate a flowchart depicting a method for generating an improved user interface for data analytics and optimized data insights, in accordance with various embodiments of the present invention.

At step 902, a first type of data analytics action is performed. In an embodiment of the present invention, one or more users sends a request for initiating a first type of data analytics action by inserting values for search in a search bar of a Graphical User Interface (GUI). The user may include, but is not limited to, data consumers, data analysts, data scientists, leaders/owners of data and Information Technology (IT) administration. The first type of data analytics action may include, but is not limited to, a search request for one or more analytical assets (or solutions) carried out in an organization such as, data searching, data insights generation, data reports generation, dashboard insights generation, data model determination, etc. For example, the user may search for data related to attrition in an organization for analysis and generating insights.

In an embodiment of the present invention, the user is authenticated by carrying out a Single-Sign-On (SSO) authentication. In an exemplary embodiment of the present invention, the search request is an AI based search. The search is carried out for at least, but not limited to, data and asset determination, data insights generation and data insights recommendations.

At step 904, data insights information is fetched for rendering and visualization of data assets related to search results as one or more result sets. In an embodiment of the present invention, data insights information is fetched for rendering and visualization of search results as one or more result sets via the dynamic Graphical User Interface (GUI). The GUI renders a unified catalog of multiple analytical assets for visualization and consumption by the users via a single self-service data interface. The single self-service data interface is associated with multiple BI tool technologies associated with the received user request. In an exemplary embodiment of the present invention, the analytical assets include, but are not limited to, data sets, data reports, data insights, dashboards, and data models. The BI tool technologies may include, but are not limited to, big data sources and on-premises and SaaS applications (such as, Power BI®, Qlik Sense®, Tableau®, Oracle® cloud analytics, etc.). Multiple BI tool technologies which are accessed via one or more embedded analytics services for rendering the data insights in the event of launching the analytical assets from a search result via the UI.

At step 906, data asset usage and access policy are defined based on a single window role configuration function. In an embodiment of the present invention, the data assets are fetched in order to render the one or more data assets related to search sets as the one or more result sets via the UI for the received search request. In an exemplary embodiment of the present invention, the result sets are rendered via the UI based on one or more rendering techniques such as, but are not limited to, ranking of result sets, accessing criteria of the result sets and frequency of usage of result sets.

In an embodiment of the present invention, the data assets are fetched via embedded APIs (e.g., analytics Java Script (JS) APIs). In an embodiment of the present invention, a single window role configuration function is provided to enable user-based access for usage and define data asset usage and access privacy. The single window role configuration is used in the data source for providing Row Level Security (RLS) in order to carry out data analytics and generating data insights for the user roles across various technologies. In an exemplary embodiment of the present invention, the role owner may at least create roles, tag users, and assign roles to various users. The asset owners may use these roles for providing asset access to the users. In an embodiment of the present invention, feature sets are provided that enable users to configure page level access to the asset for providing personalized rendering of assets. Further, a sharing functionality is provided for sharing the one or more data assets across the organization for access by multiple users. Sharing of one or more data assets relates to sharing of data assets by a first user to a second user based on a sharing request sent by the second user to the first user. The second user may visualize the data asset at his/her end, instead of configuring a new data asset. For example, if a first user has a data asset or visualization type generated for a demand and supply operation and the second user requires to view the same, then the second user may send a request to the first user for viewing and using the already generated visualization type for demand and supply or to use this visualization type inside his/her dashboards with combined assets. The first user may provide access to the second user for viewing the same at the second user's end.

In an embodiment of the present invention, functionality is provided to users to switch between multiple roles and access the visualizations with the respective insight and data summary on the UI. In an embodiment of the present invention, any changes made to the user roles are tracked. Further, history associated with the role change is also tracked.

At step 908, the data assets are rendered as one or more visualization types. In an embodiment of the present invention, user-based security is provided for the fetched data assets. In an embodiment of the present invention, the fetched data assets are transmitted for rendering via the UI, which further functions as a custom data interface. The fetched data assets are rendered in the form of one or more visualization types associated with different BI tools via the UI for the search request based on a pre-defined set of rules. The visualization types may include, but are not limited to, one or more dashboards for data assets, reports and insights on the data assets, data sets of the data asset, and model created for the data assets. In an embodiment of the present invention, the visualization types are capable of being downloaded based on a download request sent by the users via the UI. In an exemplary embodiment of the present invention, the visualization types may be downloaded in a pre-defined format such as, but is not limited to, Portable Document Format (PDF) and a Power Point Presentation (PPT) along with, applied filters, visual filters, and slicers. The downloaded visualization types may include, but are not limited to, downloaded data asset dashboards, downloaded data asset report, downloaded data asset models. In an embodiment of the present invention, alerts and email notifications are sent to a user device for sharing the generated visualization types. In an embodiment of the present invention, a one-click functionality is provided to choose and enable viewing of different visualization types via the user devices.

At step 910, the rendered multiple data assets are combined based on a second type of data analytics action. In the embodiment of the present invention, the rendered data assets, in the form of visualization types, are capable of being configured based on a second type of data analytics action, via the UI, for combining multiple assets. A dashboard configuration feature is provided, which includes a first feature set to rapidly configure dashboard and generate visualization types with mixed analytical assets from the one or more BI tool technologies. In an exemplary embodiment of the present invention, the first feature set provides functionality of combining the assets together for rapidly configuring and rendering visualization types, irrespective of the BI tool technology. In another embodiment of the present invention, the dashboard configuration feature further includes a second feature set. In an exemplary embodiment of the present invention, based on the second feature set, user specific access configuration is provided to the rendered dashboards along with interface functionalities such as, but are not limited to, drag, and drop functionality for creating the visualization types on the UI and hide and show functionality for the rendered visualization types.

At step 912, one or more service types associated with the visualization types are provided. In an embodiment of the present invention, the one or more service types may include, but are not limited to, management services, search services, and fulfilment services. In an exemplary embodiment of the present invention, the management services provide for downloading of a batch of visualization types and administration services.

In another exemplary embodiment of the present invention, search services relate to searching of the visualization types associated with the data assets. For example, searching may relate to searching for data, dashboards associated with the data, insights associated with data and models associated with data, as elaborated above in the specification. In yet another embodiment of the present invention, fulfilment services relating to rendering and visualization of visualization types is provided based on embedding services of respective BI tool technologies or embedding services. In an embodiment of the present invention, the data is stored for rendering.

In an embodiment of the present invention, downloading of a batch of visualization types is carried out via embedding services based on an initiation event comprising a user request received. The user having authorization and authentication for accessing the visualization types may download the visualization types. Further, the data assets associated with the visualization types are fetched, which are required to be downloaded. In an exemplary embodiment of the present invention, a certificate and/or a token-based authentication is used for fetching the data assets associated with the visualization types, which are required to be downloaded. In an exemplary embodiment of the present invention, the visualization types may be downloaded from cloud. In another embodiment of the present invention, access services are enabled by a user (e.g., data asset owners) having authentication and authorization. The authentication is carried out via API and authorization is based on user role. The access services manage one or more functions such as, but are not limited to, user roles for accessing the visualization types associated with the datasets, roles systems associated with the user roles and meta-data management associated with the roles.

In an embodiment of the present invention, one or more rule-based UI usage access is provided. In an embodiment of the present invention, every action of the user carried out via the UI is tracked by using the BI tools. The tracked user action may include, but is not limited to, a click on the UI made by the user, usage of assets and configuration changes carried out via the UI by the user. In another embodiment of the present invention, anomalies related to access and operation of subsystem are tracked by monitoring tokens provided for access of the UI.

In an embodiment of the preset invention, a self-service generation of a custom module is provided to personalize the visualization type layout and widgets including, but is not limited to, insights, key performance indicators (KPIs), and reports from different data assets from across multiple BI technologies. In an embodiment of the present invention, a BI analyzer is provided for generating dashboard by accessing the data sets, reports, and data model assets.

Advantageously, in accordance with various embodiments of the present invention, the present invention provides for a single platform for rendering BI and AI analytical assets. The present invention provides for a personalized user experience to view data insights based on data users. The present invention provides for a standard uniform UI to access assets irrespective of underlying BI technology. The present invention provides for a user-friendly UI which enables users to add assets and configure dashboards. The present invention provides for a one-click asset addition which requires only two metadata, in an exemplary embodiment of the present invention. Further, the present invention provides for drag and drop features enabling easy dashboard configuration. Furthermore, the present invention provides for rapidly configuring and publishing dashboards including mixed data assets from multiple BI technologies in less than 30 minutes, in an example embodiment of the present invention. The present invention provides for an intelligent AI powered search for insights and recommendation of assets. The present invention provides for a single window role configuration to enable user-based access and for use in the data source for RLS in order to carry out data analytics and generate data insights for the user roles across various technologies. Further, the present invention provides for a role-based report pages hide and show functionality. Furthermore, the present invention provides functionality to users with multiple roles to switch roles and view the respective insights. Yet further, the present invention provides for usage analytics for asset owners to monitor usage and also provides audit details to track changes carried out in the configurations via the UI. Yet further, the present invention provides for determining data insights generation accountability, maintaining privacy and security and monitoring usage and access in a controlled single environment.

Figure 10:
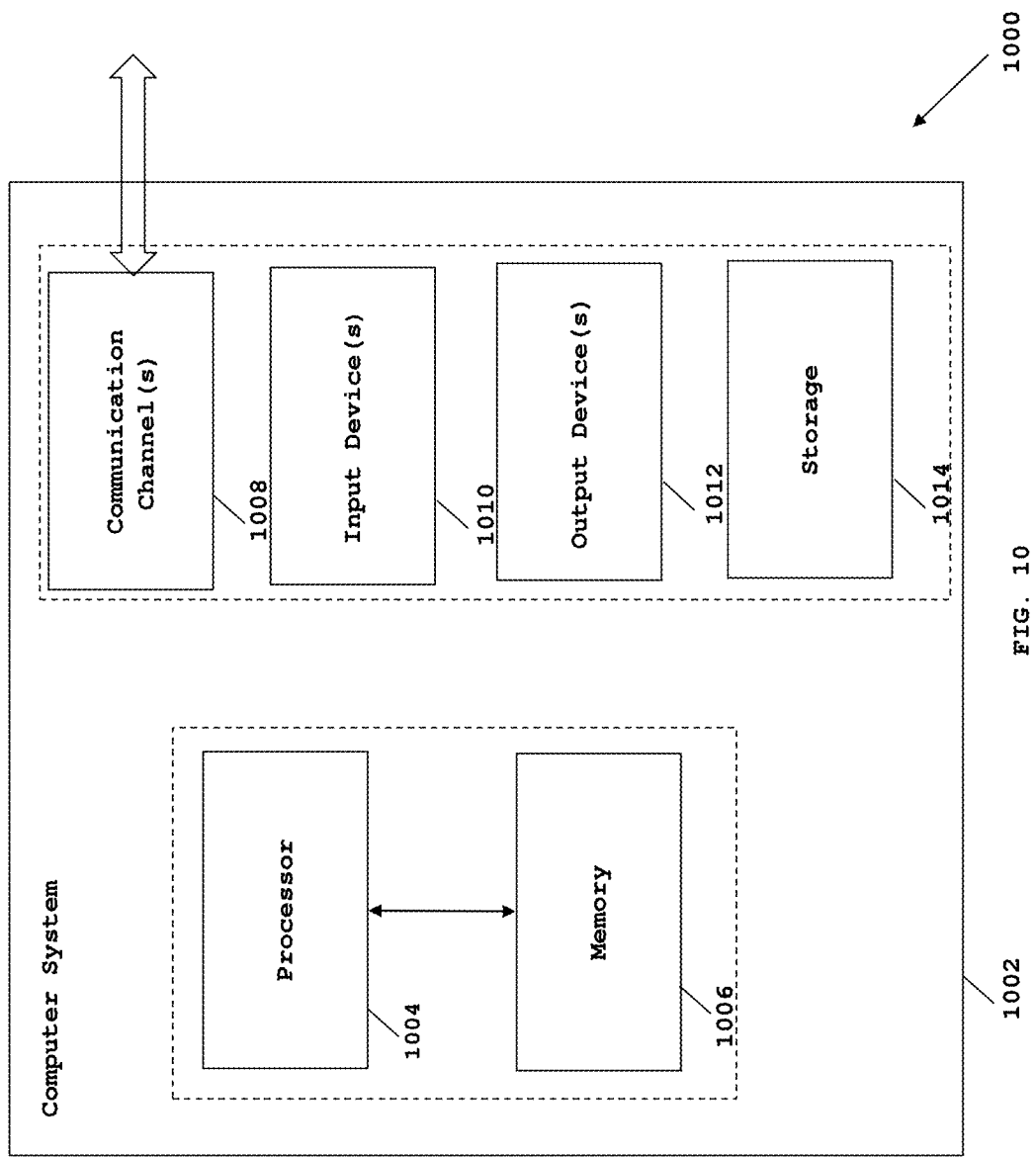
FIG. 10 illustrates an exemplary computer system in which various embodiments of the present invention may be implemented.

FIG. 10 illustrates an exemplary computer system in which various embodiments of the present invention may be implemented. The computer system 1002 comprises a processor 1004 and a memory 1006. The processor 1004 executes program instructions and is a real processor. The computer system 1002 is not intended to suggest any limitation as to scope of use or functionality of described embodiments. For example, the computer system 1002 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 1006 may store software for implementing various embodiments of the present invention. The computer system 1002 may have additional components. For example, the computer system 1002 includes one or more communication channels 1008, one or more input devices 1010, one or more output devices 1012, and storage 1114. An interconnection mechanism (not shown) such as a bus, controller, or network, interconnects the components of the computer system 1002. In various embodiments of the present invention, operating system software (not shown) provides an operating environment for various softwares executing in the computer system 1002 and manages different functionalities of the components of the computer system 1002.

The communication channel(s) 1008 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth, or other transmission media.

The input device(s) 1010 may include, but not limited to, a keyboard, mouse, pen, joystick, trackball, a voice device, a scanning device, touch screen or any another device that is capable of providing input to the computer system 1002. In an embodiment of the present invention, the input device (s) 1010 may be a sound card or similar device that accepts audio input in analog or digital form. The output device(s) 1012 may include, but not limited to, a user interface on CRT or LCD, printer, speaker, CD/DVD writer, or any other device that provides output from the computer system 1002.

The storage 1014 may include, but not limited to, magnetic disks, magnetic tapes, CD-ROMs, CD-RWs, DVDs, flash drives or any other medium which can be used to store information and can be accessed by the computer system 1002. In various embodiments of the present invention, the storage 1014 contains program instructions for implementing the described embodiments.

The present invention may suitably be embodied as a computer program product for use with the computer system 102. The method described herein is typically implemented as a computer program product, comprising a set of program instructions which is executed by the computer system 1002 or any other similar device. The set of program instructions may be a series of computer readable codes stored on a tangible medium, such as a computer readable storage medium (storage 1014), for example, diskette, CD-ROM, ROM, flash drives or hard disk, or transmittable to the computer system 1002, via a modem or other interface device, over either a tangible medium, including but not limited to optical or analogue communications channel(s) 1008. The implementation of the invention as a computer program product may be in an intangible form using wireless techniques, including but not limited to microwave, infrared, Bluetooth, or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the scope of the invention.

We claim:

1. A system for generating an improved user interface for data analytics, the system comprises:
   a memory storing program instructions;
   a processor executing program instructions stored in the memory; and
   a user interface generation engine executed by the processor and configured to:
      perform a first type of data analytics action based on a user request by inserting values for search in a search bar of a Graphical User Interface (GUI) rendered via a user device, wherein the first type of data analytics action comprises a search request for one or more analytical assets including data searching, data insights generation, data reports generation, dashboard insights generation, and data model determination, and wherein the search request is an Artificial Intelligence (AI) based search;
      fetch data insights based on the first type of data analytics action for rendering one or more data assets as one or more result sets via the GUI, wherein metadata associated with the data assets is not saved for maintaining data privacy;
      provide a sharing functionality for sharing the one or more data assets for multiple access; and
      render the data assets in the form of one or more visualization types associated with different Business Intelligence (BI) tools based on a pre-defined set of rules, wherein the rendered multiple data assets are combined based on a second type of data analytics action for configuring and rendering a dashboard, and wherein the one or more visualization types are shared amongst users for visualization of the rendered data assets for reducing duplication of the same visualization types, and wherein alerts and notifications are sent to the user device for sharing visualization types.

2. The system as claimed in claim 1, wherein the user interface generation engine comprises an analytical asset catalog unit executed by the processor and configured to fetch data insights from a dashboard configuration unit based on the first type of data analytics action for rendering one or more search results associated with the data insights as one or more result sets via a dynamic Graphical User Interface (GUI) rendered on a user device.

3. The system as claimed in claim 2, wherein the GUI renders a unified catalog of the analytical assets for visualization and consumption via a single self-service data interface provided by a data asset rendering unit.

4. The system as claimed in claim 2, wherein the user interface generation engine comprises a self-service unit, executed by the processor, associated with multiple BI tool technologies accessible by the analytical asset catalog unit via one or more embedded analytics services for rendering the data insights in the event of launching the analytical assets from the search result via the GUI.

5. The system as claimed in claim 1, wherein the result sets are rendered via a GUI based on one or more rendering techniques comprising ranking of result sets, accessing criteria of the result sets and frequency of usage of result sets.

6. The system as claimed in claim 1, wherein the user interface generation engine comprises a role creation and management unit executed by the processor and configured to provide a single window role configuration function to enable user-based access for usage by a data asset fetching unit and define data asset usage and access privacy, and wherein the single window role configuration is used in a data source for providing a Row Level Security (RLS) for carrying out the data analytics and generating the data insights for user roles across various technologies, and wherein the RLS is provided for the fetched data assets.

7. The system as claimed in claim 1, wherein sharing one or more data assets comprises sharing data assets by a first user to a second user based on a sharing request sent by the second user to the first user.

8. The system as claimed in claim 6, wherein the role creation and management unit is configured to provide a functionality to switch between multiple roles and access the data insight and data summary on the GUI.

9. The system as claimed in claim 6, wherein the user interface generation engine comprises a role change tracking unit executed by the processor and configured to track changes made to user roles and history associated with a role change.

10. The system as claimed in claim 1, wherein the visualization types include the one or more dashboards for data assets, reports, and insights for the data assets, data sets of the data asset, and model created for the data assets from multiple BI technologies.

11. The system as claimed in claim 10, wherein the visualization types are capable of being downloaded based on a download request sent from the user device via a GUI to a story export unit, and wherein the visualization types are downloaded in a pre-defined format including Portable Document Format (PDF) and a Power Point Presentation (PPT) along with applied filters, visual filters, and slicers.

12. The system as claimed in claim 1, wherein the user interface generation engine comprises a user interface generation and rendering unit executed by the processor and configured to provide a one-click functionality to choose and enable viewing of different visualization types via a user device.

13. The system as claimed in claim 1, wherein the user interface generation engine comprises a dashboard configuration unit executed by the processor and configured to provide the dashboard configuration feature including a first feature set to configure the dashboard and generate visualization types with the analytical assets from the one or more BI tool technologies, and wherein the first feature set provides functionality of combining the data assets for configuring and rendering the visualization types, irrespective of the BI tool technology.

14. The system as claimed in claim 12, wherein the visualization type configuring unit, based on a second feature set, is configured to provide user specific access configuration to the rendered dashboards along with interface functionalities including a drag and drop functionality for creating the visualization types on a GUI and hide and show functionality for the rendered visualization types.

15. The system as claimed in claim 1, wherein the user interface generation engine comprises a user interface generation and rendering unit executed by the processor and configured to provide one or more service types associated with the visualization types in communication with a self-service unit, and wherein the one or more service types include, management services, search services and fulfilment services.

16. The system as claimed in claim 15, wherein the management services provide for downloading of a batch of visualization types and administration services, and wherein the search services relate to searching of the visualization types associated with the data assets by an intelligent search unit, and wherein the fulfilment services relate to rendering and visualization of visualization types based on embedding services of respective BI tool technologies or embedding services.

17. The system as claimed in claim 1, wherein the user interface generation engine comprises a usage analytics unit executed by the processor and configured to provide a rule-based GUI usage access, and wherein the user interface generation engine comprises a logging and monitoring unit executed by the processor and configured to track every action of the user carried out via the GUI by using the BI tools associated with a visualization type configuration unit, and wherein the logging and monitoring unit is configured to track anomalies related to access and operation of the user interface generation engine by monitoring tokens provided for access of the GUI.

18. The system as claimed in claim 1, wherein the user interface generation engine comprises a self-service unit executed by the processor and configured to provide a self-service generation of a custom module to personalize the visualization type layout and widgets including, insights, key performance indicators (KPIs) and reports from different data assets from across multiple technologies, and wherein a user interface generation and rendering unit is configured to provide a BI analyzer for generating the dashboard by accessing data sets, reports and data model assets.

19. A method for generating an improved user interface for data analytics, the method is implemented by a processor executing instructions stored in a memory, the method comprises:

performing a first type of data analytics action based on a user request by inserting values for search in a search bar of a Graphical User Interface (GUI) rendered via a user device, wherein the first type of data analytics action comprises a search request for one or more analytical assets including data searching, data insights generation, data reports generation, dashboard insights generation, and data model determination, and wherein the search request is an Artificial Intelligence (AI) based search;

fetching data insights based on the first type of data analytics action for rendering one or more data assets as one or more result sets via the GUI, wherein metadata associated with the data assets is not saved for maintaining data privacy;

providing a sharing functionality for sharing the one or more data assets for multiple access; and rendering the data assets in the form of one or more visualization types associated with different Business Intelligence (BI) tools based on a pre-defined set of rules, wherein the rendered multiple data assets are combined based on a second type of data analytics action for configuring and rendering a dashboard, and wherein the one or more visualization types are shared amongst users for visualization of the rendered data assets for reducing duplication of the same visualization types, and wherein alerts and notifications are sent to the user device for sharing visualization types.

20. The method as claimed in claim 19, wherein the method comprises providing a single window role configuration function to enable user-based usage access and data asset usage and defining access privacy, and wherein the single window role configuration is used in a data source for providing a Row Level Security (RLS) for carrying out data analytics and generating data insights for user roles across various technologies, and wherein the RLS is provided for the fetched data assets.

21. The method as claimed in claim 19, wherein the visualization types are capable of being downloaded based on a download request sent via the GUI, and wherein the visualization types are downloaded in a pre-defined format such as, Portable Document Format (PDF) and a Power Point Presentation (PPT) along with, applied filters, visual filters, and slicers.

22. The method as claimed in claim 19, wherein the method comprises providing the dashboard configuration feature including a first feature set to configure the dashboard and generate visualization types with the analytical assets from the one or more BI tool technologies, and wherein the first feature set provides functionality of combining the data assets for configuring and rendering the visualization types, irrespective of the BI tool technology.

23. The method as claimed in claim 19, wherein one or more service types associated with the visualization types are provided, and wherein the one or more service types include, management services, search services and fulfilment services.

24. The method as claimed in claim 19, wherein the method comprises generating a self-service custom module to personalize the visualization type layout and widgets including, insights, key performance indicators (KPIs) and reports from different data assets from across multiple technologies, and wherein a BI analyzer is provided for generating the dashboard by accessing data sets, reports, and data model assets.

25. A computer program product comprising:

a non-transitory computer-readable medium having computer program code stored thereon, the computer-readable program code comprising instructions that, when executed by a processor, causes the processor to:

perform a first type of data analytics action based on a user request by inserting values for search in a search bar of a Graphical User Interface (GUI) rendered via a user device, wherein the first type of data analytics action comprises a search request for one or more analytical assets including data searching, data insights generation, data reports generation, dashboard insights generation, and data model determination, and wherein the search request is an Artificial Intelligence (AI) based search;

fetch data insights based on the first type of data analytics action for rendering of one or more data assets as one or more result sets via the GUI, wherein metadata associated with the data assets is not saved for maintaining data privacy;

provide a sharing functionality for sharing the one or more data assets for multiple access; and render the data assets in the form of one or more visualization types associated with different Business Intelligence (BI) tools based on a pre-defined set of rules, wherein the rendered multiple data assets are combined based on a second type of data analytics action for configuring and rendering a dashboard, and wherein the one or more visualization types are shared amongst users for visualization of the rendered data assets for reducing duplication of the same visualization types, and wherein alerts and notifications are sent to the user device for sharing visualization types.

* * * * *